Sept. 11, 1973  H. A. FREMONT  3,758,405
COLOR REMOVAL FROM KRAFT MILL AQUEOUS EFFLUENTS
Filed Nov. 3, 1971  2 Sheets-Sheet 1

INVENTOR
HENRY A. FREMONT

BY
Pennie, Edmonds, Morton, Taylor & Adams
ATTORNEYS

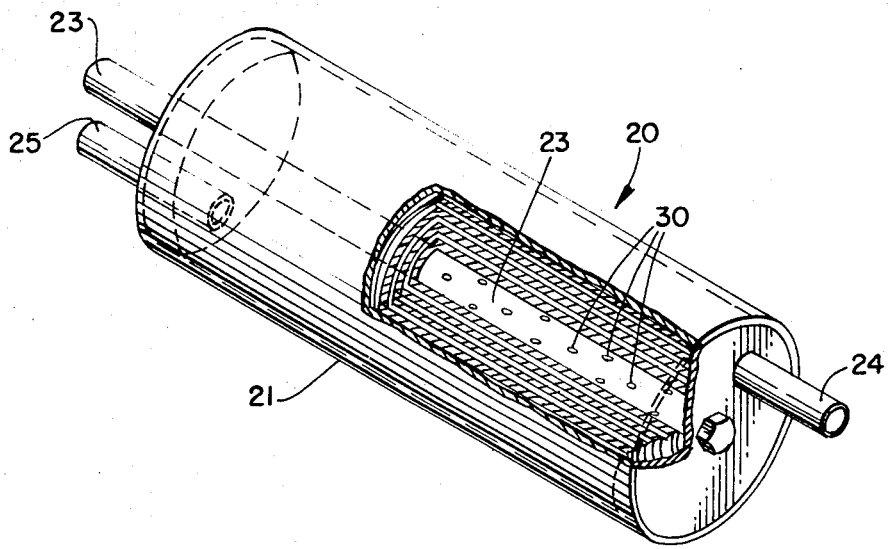
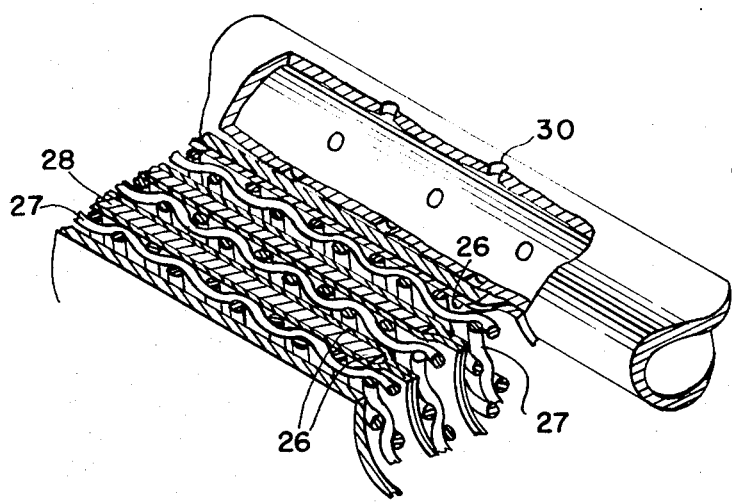

United States Patent Office 3,758,405
Patented Sept. 11, 1973

3,758,405
COLOR REMOVAL FROM KRAFT MILL AQUEOUS EFFLUENTS
Henry A. Fremont, Hamilton, Ohio, assignor to U.S. Plywood-Champion Papers, Inc.
Filed Nov. 3, 1971, Ser. No. 195,383
Int. Cl. C02c 5/06
U.S. Cl. 210—23                      10 Claims

ABSTRACT OF THE DISCLOSURE

This invention relates to an apparatus system and a continuous method of removing and disposing of color bodies in aqueous effluents from Kraft pulp manufacturing operations containing such bodies comprising adjusting the pH of said effluents to from about neutrality to about 9, subjecting the effluent to ultrafiltration to form an aqueous permeate and a retentate containing substantially all the color bodies in said effluent in a solids concentration of at least about 15%, and thermally oxidizing the retentate at a temperature and for a time sufficient to oxidize the color bodies to colorless inorganic salts and colorless inorganic gases which can be safely disposed of.

BACKGROUND OF THE INVENTION

A large volume of water is utilized in pulping operations and the resultant waste water or effluent, which is almost always discharged into natural bodies of water, such as rivers, streams, lakes, and the like, is high in biological oxygen demand (BOD) and in color may be hot as well as alkaline in pH. The magnitude of this problem is particularly severe in Kraft pulping operations where, typically, about 25 thousand gallons per ton of pulp of effluent or waste water are discharged.

While at present there are techniques available to control the pH, temperature and BOD of this effluent, a significant portion of the BOD and the color bodies cannot conveniently and economically be removed from the effluent. The color bodies found in such pulp and paper mill waste are especially difficult to remove becasue they are resistant to biological degradation and present a further problem in that they are organic materials and many are toxic to aquatic life. Such danger is in addition to the unaesthetic appearance of water to which these color bodies are added. This color problem is well known and measurements of the amount of color bodies in effluents, as color units, are carried out in accordance with the analytical porcedure set forth in "Standard Methods: Water and Wastewater," 12th edition (1965) APHA.

Attempts to control this color problem have included the use of aerated lagoons, activated sludge treatments, lime precipitation, carbon adsorption, and reverse osmosis. None of these procedures is satisfactory for commercial operations because they are not capable of handling the large volumes of waste water which must be treated in an efficient and economical manner. Of these procedures, reverse osmosis has been actively considered, but is generally undesirable in that such process requires the use of high pressures (above about 500 p.s.i.), can only concentrate the effluent to about 8 to 10% total solids, and it concentrates all dissolved solutes in the effluents to produce the demineralized water. As a result, a large amount of concentrate will be formed which contains a great deal of the salts present in the water making it difficult to dispose of the concentrate. In addition, there is the problem of membrane fouling and failure due to the formation of "scale" or "slime" by virtue of high solute concentration and in particular the precipitation of the calcium deposits on the membranes. This fouling of the membranes surface not only requires extensive cleaning but also causes increases in the operating pressures of the system causing failure of the membrane. Lastly, the low solids content and its high inorganic solids concentration makes it expensive to dispose of the concentrate as by incineration.

BRIEF DESCRIPTION OF THE INVENTION

The present invention provides a continuous, inexpensive, and nonpolluting method and apparatus system for the removal and disposal of color bodies from aqueous effluents from Kraft pulping operations.

Briefly stated, the present invention comprises the continuous method of removing and disposing of organic color bodies found in aqueous effluents from Kraft pulp manufacturing operations comprising adjusting the pH said effluents to from about neutrality to about 9, subjecting the effluents to ultrafiltration to form an aqueous permeate and a retentate containing substantially all of the color bodies in said effluents and having a solids concentration of at least about 15% and heating the retentate in the presence of oxygen at a temperature and for time sufficient to oxidize the color bodies to colorless inorganic salts and colorless inorganic gases which can be safely disposed of. The invention also comprises an apparatus system for carrying out such method comprising the combination of means for adjusting the pH of said effluent stream, means for ultrafiltration of said stream after the adjustment of pH, and means for combusting the color bodies separated from said effluent stream by said ultrafiltration means as more fully described below.

DESCRIPTION OF THE DRAWING

FIG. 3 is a perspective view, partially cut away, of a spiral wound filtration cell, and FIG. 4 is an enlarged partial view of a portion of the membrane module depicted in FIG. 3.

DETAILED DESCRIPTION

Figure 2:
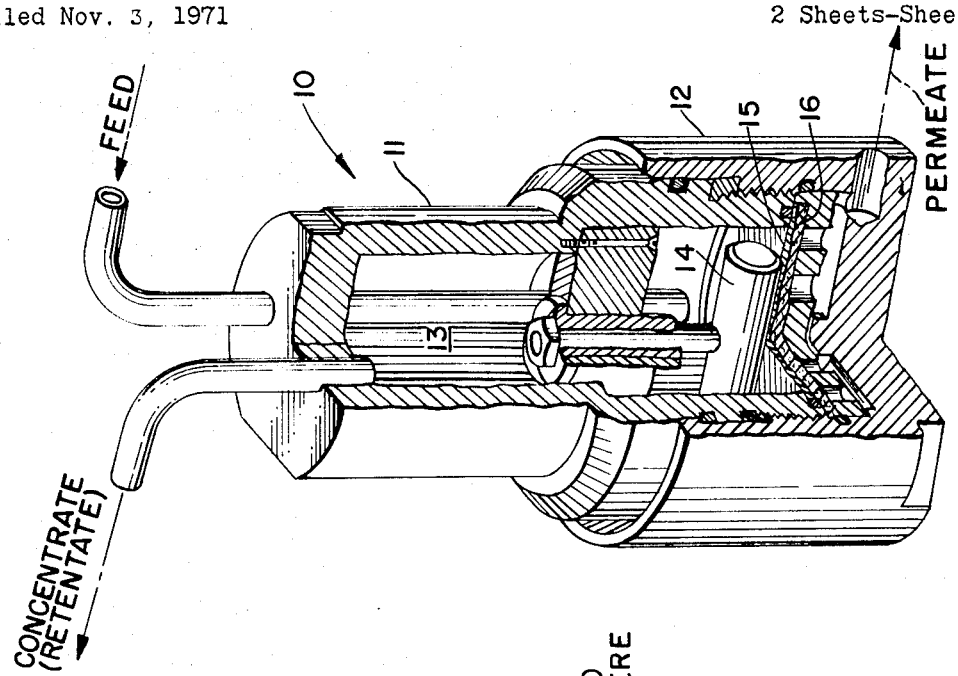
FIG. 2 is a cut away perspective view of a stirred ultrafiltration cell.
Figure 1:
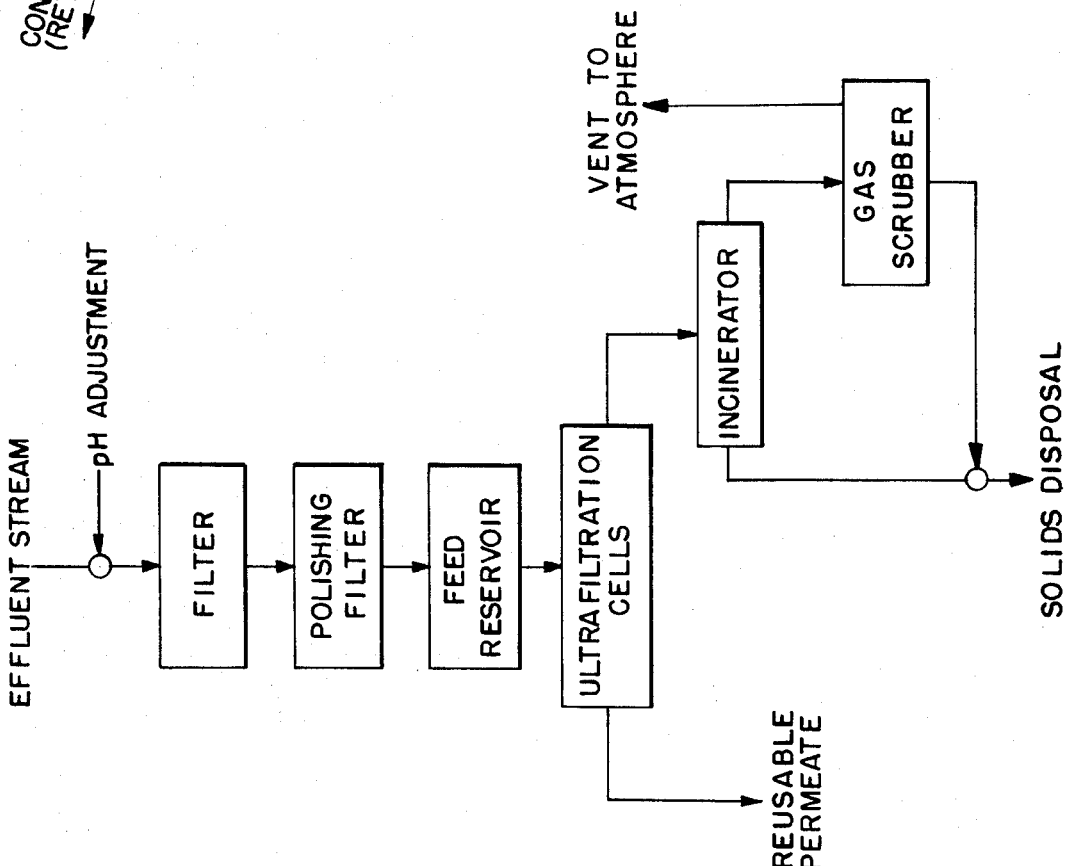
FIG. 1 is a flow diagram of the process of the instant invention.

While the instant process is applicable to all effluent streams from Kraft pulping operations, it will be described in connection with first stage caustic extraction filtrate from a Kraft process plant. Such filtrate generally comprises only a minor portion of a total Kraft mill's waste water (approximately 3 to 6%), it but contains more than 50% of the color bodies (color units) in Kraft mill waste water. Such color bodies have been found to be organic in nature.

Referring to the drawings, there is shown a flow diagram depicting the process in broad terms. The process comprises adjusting the first stage caustic extraction effluent by addition of acid. This pH adjustment can be accomplished using any acid, such as sulfuric, and by adding the acid and effluent to a conventional in-line mixing device or a pipe of sufficient length to provide complete mixing. The rate of acid addition is controlled by conventional in-line pH probes located after such mixing means. Depending upon the temperature of the effluent, it may be necessary to cool it to a temperature below 125° F. prior to processing the ultrafiltration units in order to avoid damage to the membranes in the cells.

After the pH adjustment (and temperature adjustment if necessary), the effluent is preferably filtered through a non-molecular filter which will remove the suspended solids. This can be any conventional filter of the rotary vacuum drum type, gravity type, or sand bed type. In addition, polishing filters can be provided to insure the removal of the very small suspended solids in the order of microns. It is desirable to use one or both of these preliminary filtering operations since this helps to minimize any possible fouling of the ultrafiltration membranes by such solids. The thus filtered effluent is then pumped at the required pressure through ultrafiltration cells, more particularly described below, having membranes of a pore size to retain the color bodies in the effluent while permitting lower molecular weight materials, such as inorganic salts, to pass therethrough. In order to have a steady source of material for the ultrafiltration cells it is preferred to place the effluent either before or after coarse filtration into a surge tank or feed reservoir.

The permeate from the ultrafiltration cells can be recycled for further use and the concentrate or retentate is burned in any incinerator adapted to burn high-solids liquids. The residual ash, volatile acids, such as hydrochloric acid, and other volatiles are removed from the off gases by scrubbing prior to venting. This will act to eliminate any possible or potential air pollution. The solid wastes removed from the gas scrubber are combined with the solids formed by incineration and can be disposed of in any conventional manner. Thermal oxidation is important in order to render the color bodies colorless by the oxidation that occurs during combustion. The colorless inorganic solids formed by this oxidation also require very little, if any, biological oxygen.

Ultrafiltration is a membrane process for the concentration of dissolved materials in aqueous solutions. A semipermeable membrane is used as the separating agent and pressure as the driving force. In an ultrafiltration process a feed solution is introduced into a membrane unit or cell where water and certain solutes pass through the membrane having a predetermined pore size under an applied hydrostatic pressure. Solutes whose sizes are greater than the pore size of the membrane are retained and concentrated. The pore structure of the membrane thus acts as a molecular filter, passing some of the smaller size solutes and retaining the larger size solutes. The pore structure of this molecular filter is such that it does not become plugged because the solutes are rejected at the surface and do not penetrate the membrane. Furthermore, there is no continuous buid-up of a filter cake which has to be removed periodically to restore flux (rate of solution transport through the membrane) since concentrated solutes are removed in solution.

In accordance with the present invention, it has been found that regulation of the pore size to retain the high molecular weight organic color bodies and permit the lower molecular weight organics and inorganics to be passed through the membrane into the permeate has many advantages. For the color bodies ordinarily found in Kraft mill effluent, a membrane with a pore size of from about 0.01 to 0.05 micron is used. This port size can be varied dependent upon the size of the color bodies in the particular stream being treated. Such regulation of pore size permits high efficiency in retention of the organic color bodies and allows concentration to very high volumetric reduction ratios since the inorganic salts which comprise the bulk of the dissolved solids are not retained in the concentrate. This avoids both a buildup of a high osmotic pressure in the concentrate which would inhibit concentration to high solids levels, and fouling resulting from increased concentrations of both organics and inorganics (e.g., residual calcium salts). Furthermore, a concentrate is obtained in the ultrafiltration process which contains primarily organic materials and disposal of this concentrate by incineration is substantially facilitated by the removal of inorganics, especially chlorides. It is possible to consider use of this purified organic concentrate as a suitable base for the production of byproduct chemicals.

The ultrafiltration cell used can be any commercially available with a wide variety of membranes available for use. A conventional stirred cell with a diaphragm-type membrane is depicted in FIG. 2. Such membranes are readily conventionally available and can be used as set forth in FIG. 2, or tubular or spiral wound membranes can be utilized. It is preferred to use spiral wound membranes such as shown in FIGS. 3 and 4. As is known, the membranes are usually modified cellulose acetate films approximately 100 microns in thickness with an active (dense) surface layer of approximately 0.2 micron. These membranes are manufactured by dissolving cellulose acetate in a mixture of solvents and then casting the mixture as a thin film. The solvents are evaporated and the film gelled. The surface of the film from whiuh the evaporation first took place becomes the dense, active layer. The gelled film (or membrane) is then treated with hot water and is thereby caused to shrink to its final state.

Referring to FIG. 2, there is shown a stirred ultrafiltration cell 10 having an outer jacket 11 and cap 12 defining an interior passage 13, with a magnetically controlled stirrer 14, attached to the interior of jacket 11 in the passage 13. A feed inlet and concentrate outlet are provided at the top of the cell and a permeate outlet at the bottom of the cell. Spaced below the stirrer 14 and disposed between the feed inlet and permeate outlet in the passage 13 is membrane 15 supported on a sintered disc 16.

The operation of the cell will be largely evident from the description given. The effluent is pumped through the feed inlet into the passage 13. The bulk of the water and smaller molecular weight material will pass through the membrane 15 and sintered disc 16 and be discharged through the permeate outlet. The color bodies and minor amount of water are discharged through the retentate outlet. The stirrer is operated by magnetic means (not shown) at the bottom of the cap 12.

As to FIGS. 3 and 4, there is shown a spiral wound cell 20 comprising an outer jacket 21 and spiral wound membrane module 22 in the jacket with a perforated hollow tube 23 having perforations 30 and extending through the cell. An effluent inlet 24 and retentate outlet 25 are also provided. The cell 20 has been shown partially cut away to illustrate the spiral wound nature of the membrane module 22.

The enlarged sectional view of the membrane module as shown in FIG. 4, shows the membrane 26 and spacer 27 wound about the perforated hollow tube 23 in the form of a spiral so that there are alternate layers of membrane 26 and spacers 27. Support means 28 are also provided. The spacer acts to provide passageways for the retentate. During operation, the effluent stream, under pressure, is introduced into the cell 20 through inlet 24 and passes axially through the membrane 26 and support means 28. The color bodies cannot pass through the membrane 26; but pass through the spacer 27 and exit out the bottom of the cell 20 through retentate outlet 25. The remainder of the effluent permeates the membrane 26 and travels through the support 28 spacer 27 into the central tube through perforations 30. The permeate exits the cell 20 through the bottom of tube 23.

The spiral wound membrane module 22 is formed by first forming a "sandwich" of two sheets of membrane 26 separated by a porous support or backing material 28. The backing material 28 supports the membrane under operating pressure and provides a path for leading off the permeate. One side of the sandwich is lapped over and sealed to the perforated tube 23. The sandwich is then rolled up around the central tube 23 to form the spiral shown in FIG. 3. The mesh spacer 27 is introduced between the facing membrane surfaces to provide passageways for the retentate.

In commercial operation the number of ultrafiltration cells to be used is determined by the total volume of the effluent stream to be treated, the membrane area, and the separation efficiency which is affected by composition and pH of the effluent, temperature and pressure of operation, and feed flow rate through the membrane (flux). Once these operating parameters are known, the number of ultrafiltration cells required is easily calculated in the usual manner. In addition, in order to avoid possible membrane fouling and high operating pressures the cells can be arranged in stages separated by pumps so that the effluent stream can be passed sequentially therethrough each stage. In this manner a single pass through a membrane does not need to give the percentage color removal desired and this gives greater latitude in operating conditions.

In more specific detail, the pH of the effluent stream should be adjusted to a range of from about 7 to about 9; i.e. about 6.5 to 9.5. It has been found that the higher molecular weight color bodies retained by the membrane are sensitive to pH and as the pH increases much about 9.5 the color bodies are not retained by the membrane. In addition, at the higher pH's the alkalinity may adversely affect the membranes.

As to temperature, it should be kept below that at which the membrane will be adversely affected. For most commercially available membranes, a temperature above ambient to below about 125° F. can be used. After such temperature, there is no particular effect on the color body retention by the membranes. Physically, however, the higher the temperature the lower the viscosity of the water in the effluent stream flowing through the pores of the membranes.

With respect to pressure, it has been found that flux and color body retention by the membrane increase with increase in operating pressure. Consequently, it is desired to operate the membrane at the highest possible pressure. The upper limit of pressure is dependent upon the mechanical strength of the membrane and the degree of membrane compaction, with an operating range being from about 50 to 400 p.s.i. with a range of about 100 to 200 p.s.i. preferred.

The flux is dependent upon the pressure, as discussed above, and upon the concentration of solids in the effluent. The flux decreases with increase in solids.

From the foregoing, the optimum conditions for the process can be readily determined for each particular effluent stream. While 100% removal of the color bodies is theoretically possible, it is not practical in terms of power costs and equipment controls that are required to treat such large volumes of effluent. For this reason, reference to removal of "substantially" all of the color bodies from the effluent stream is intended to mean from about 80 to 95% removal.

As regards incineration, any temperature can be used which will thermally oxidize the organic color bodies. In addition to the retentate stream, it is preferred to add additional fuel, such as fuel oil, to insure proper burning.

It will be understood that the ultrafiltration will also remove other high molecular weight organic materials from the effluent and this is advantageous in that it will further lower the BOD of the permeate when it is discharged into a stream, river, lake or the like.

The invention will be further described in connection with the following examples which are set forth for purposes of illustration only.

In the examples that follow the figures given for color bodies (color units), total solids, total dissolved solids, total suspended solids were determined according to the analytical procedures set forth in "Standard Methods: Water and Wastewater," 12th edition (1965), APHA, pp. 127, 244, and 247. With respect to the color bodies (measured as Pt/Co units) absorbance at 420 m. correlated with absorbance of a standard solution is the measure used. The total solids were gravimetric analysis of the raw effluent sample with drying at 105° C.; the total dissolved solids was the same measurement but on the filtered effluent; total suspended solids was a gravimetric analysis, based on weight gain of the filter cell used to filter a measured volume of the raw effluent; and ash was also a gravimetric analysis with drying at 600° C.

EXAMPLE 1

A series of first stage caustic extraction filtrates from a Kraft pulping operation having a pH of about 11.7 were all adjusted to pH 6.8 with sulfuric acid and after coarse filtration (including passing through a polishing filter having a 5 micron pore size) were passed through an ultrafiltration cell having 32 square feet of membrane area (HF-35 and HT-00 sold by Eastman-Kodak Company). The filtrates were passed through the membranes at a circulation rate of 2 gallons per minute. The results obtained at various operation conditions are shown in Table A.

TABLE A

| Run | Membrane type | Percent total solids [1] | Operating conditions | Volumetric reduction | Average flux (gfd.) | Percent color* removal |
|---|---|---|---|---|---|---|
| 1 | HF-35 | 0.46 | 92 p.s.i. and 25° C | 108X | 18 | 83.9 |
| 2 | HF-35 | 0.46 | 125 p.s.i. and 25° C | 116X | 17.5 | 82.4 |
| 3 | HT-00 | 0.79 | 185 p.s.i. and 39° C | 22X | 22 | 90.5 |

[1] In caustic extraction filtrate.
*Based on color in neutralized effluent. Percentage would be higher if based on original effluent color and pH (11.7).

The material balance calculations and resultant composition analysis are set forth in Table B.

TABLE B

| | Effluents | Retentate | Permeate | Retentate and permeate |
|---|---|---|---|---|
| Run 1: | | | | |
| Total Material, lbs | 1,297 | 13.7 | 1,285 | 1,298.7 lbs. |
| Total dissolved solids, p.p.m. | 4,600 | 82,000 | 3,710 | 5.88 lbs. |
| Color, Pt/Co units | 13,300 | 780,000 | 2,150 | 1.35×10$^7$ lbs.-units. |
| Run 2: | | | | |
| Total material, lbs | 1,597 | 12.1 | 1,585 | 1,597.1 lbs. |
| Total dissolved solids, p.p.m. | 4,600 | 102,700 | 3,370 | 6.60 lbs. |
| Color, Pt/Co units | 10,900 | 1,330,000 | 1,860 | 1.91×10$^7$ lbs.-units. |
| Ash, p.p.m. | 3,030 | 21,600 | | |
| Run 3: | | | | |
| Total material, lbs | 1,125 | 56.5 | 1,068 | 1,124.5 lbs. |
| Total dissolved solids, p.p.m. | 7,940 | 60,500 | 6,000 | 9.72 lbs. |
| Color, Pt/Co units | 21,500 | 460,000 | 2,050 | 2.62×10$^7$ lbs.-units. |

The total solids in each run of retentate is over 15 percent and because of the high organic content the solids are readily incinerated.

It is preferred to have a retenate with a high organic content and a solids concentration above 20% to minimize the cost of thermal oxidation.

EXAMPLE 2

The instant process can be combined with reverse osmosis and a run was made with an effluent as used in Run 1 of Example 1 except that the operating conditions were 94 p.s.i. and 45° C., the volumetric reduction was 20× and the average flux 22.4 g.f.d. After such ultrafiltration the 20× concentrate (permeate) was further concentrated to 90× by reverse osmosis (RO) using a conventional RO cell with 32 square feet of membrane area (high salt rejection (97% NaCl at 600 p.s.i.)—Polymetrics, Inc.). This cell had both high salt and very high color retention. From 20× to 90×, the buildup in salt concentration was not such as to create an inoperatively high osmotic pressure and permitted the reverse osmosis to procede easily and effectively. The material balance calculations resulting from both treatments are set forth in Table C.

TABLE C

| Run 4 | Effluents | Retentate | Permeate | Retentate and permeate |
|---|---|---|---|---|
| Total material, lbs | 1,373 | 15.4 | 1,357 | 1,372.4 lbs. |
| Total dissolved solids, p.p.m. | 3,920 | 86,400 | 3,120 | 5.56 lbs. |
| Color, Pt/Co units | 10,600 | 76,500 | 1,820 | 1.43×10$^7$ lbs.-units. |

A significant advantage of the present invention is that it permits a once-through continuous removal of the color bodies and materials having a high BOD. This eliminates the holding tanks and extensive equipment required in batch and recycle procedures.

It will be understood that it is intended to cover all changes and modifications of the examples of the invention herein chosen for the purpose of illustration which do not constitute departures from the spirit and scope of the invention.

What is claimed is:

1. A process of removing and disposing of organic color bodies found in aqueous effluents from Kraft pulp manufacturing operations comprising adjusting the pH of said effluents to from about neutrality to about 9, subjecting the effluents to ultrafiltration to form an aqueous permeate and a retentate containing substantially all of the color bodies present in said effluents and having a solids concentration of at least about 15%, and heating the retentate in the presence of oxygen at a temperature and for a time sufficient to oxidize the color bodies therein to colorless inorganic salts and gases.

2. The process of claim 1 wherein the pH is adjusted to from 6.5 to 9.5 and ultrafiltration is carried out at a pressure of from about 50 to 400 p.s.i. and at a temperature below about 125° F.

3. The process of claim 2 wherein the membrane used in ultrafiltration has a pore size of about 0.01 to 0.05 micron.

4. The process of claim 3 including the step of subjecting the retentate to filtration by reverse osmosis prior to thermal oxidation.

5. The process of claim 1 including subjecting the effluent to non-molecular filtration to remove suspended solids therefrom prior to ultrafiltration.

6. The process of claim 1 wherein the effluent is the first stage caustic extraction filtrate.

7. An apparatus system for removing and disposing of organic color bodies found in effluents from Kraft pulp manufacturing operations comprising means for adjusting the pH of said effluent, ultrafiltration means for removing substantially all of the color bodies from said adjusted effluent in the form of a stream containing at least about 15% solids, and means for thermally oxidizing said stream to oxidize the color bodies therein to colorless inorganic salts and gases.

8. The apparatus of claim 7 including non-molecular filter means for removing suspended solids from said effluent prior to ultrafiltration.

9. The apparatus of claim 8 wherein said ultrafiltration means comprises at least one ultrafiltration cell having a membrane with a pore size such as to permit lower molecular weight solutes to pass therethrough but to reject substantially all of the color bodies.

10. The apparatus of claim 7 including reverse osmosis means for further filtration of the stream from the ultrafiltration means prior to thermal oxidation.

References Cited

UNITED STATES PATENTS 3,627,679  12/1971  Fuller _____ 210—45

OTHER REFERENCES

Golomb, A., et al.: Reverse Osmosis—A Review of its Applications to Waste Treatment, W. & S. W. reference number—1970, pp. R81, 82 and 84–89.

Defillipi, R. P., et al.: Application and Theory of Membrane Processes for Biological and Other Macromolecular Solutions, Abcor, Inc., Cambridge, Mass., presented at Conf. on Membranes, etc., Oct. 20 and 21, 1969, Battelle Mem. Inst., Columbus, Ohio, 28 pp. PP1-8 relied on.

CEK, Membrane Processing Upgrades Food Wastes, Environmental Science and Technology, vol. 5, May 1971, pp. 396 and 397.

MICHAEL ROGERS, Primary Examiner

U.S. Cl. X.R.

162—29; 210—63, 73, 152, 202, 321